Feb. 5, 1935. J. H. DAVIS Re. 19,453

AIR CONDITIONING APPARATUS FOR PASSENGER CARS

Original Filed Jan. 15, 1931

Inventor

Jesse H. Davis

By Fawn S. Clarkson

Attorney

Reissued Feb. 5, 1935

Re. 19,453

UNITED STATES PATENT OFFICE 19,453

AIR CONDITIONING APPARATUS FOR PASSENGER CARS

Jesse H. Davis, Baltimore, Md., assignor to B. F. Sturtevant Company, Boston, Mass., a corporation of Massachusetts Original No. 1,943,516, dated January 16, 1934, Serial No. 508,997, January 15, 1931. Application for reissue February 8, 1934, Serial No. 710,380

11 Claims. (Cl. 62—117)

Figures 1, 2:
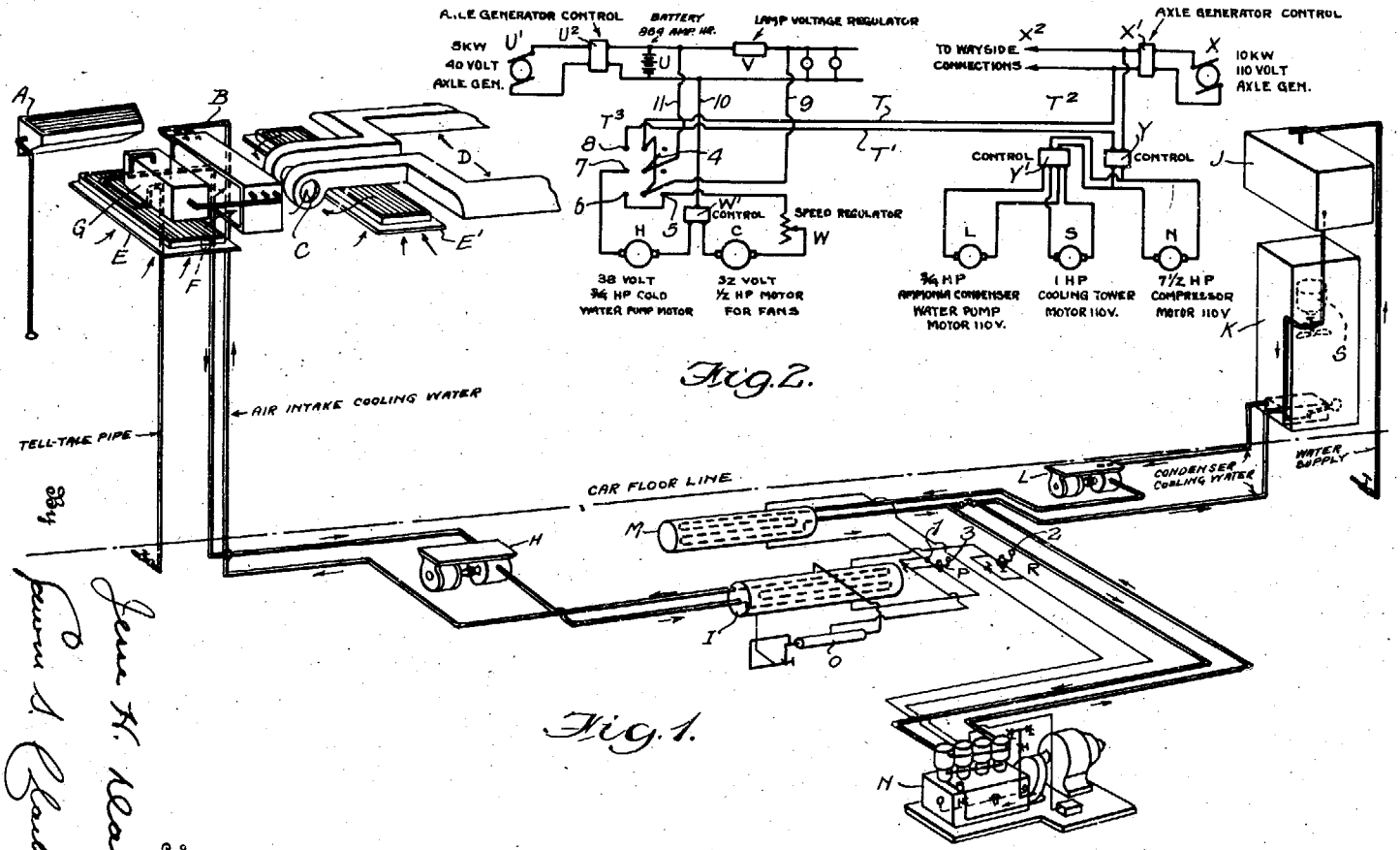

The object of my invention is to improve the method and apparatus for conditioning the air for passenger vehicles as fully set forth in my applications filed October 19, 1929, and bearing Serial Numbers 400,928, 400,929, now matured into Patent No. 1,843,210, patented Feb. 2, 1932, and 400,930, now matured into Patent No. 1,887,582, patented Nov. 15, 1932.

In the drawing:

Figure 1 is a perspective view of a car equipment designed to carry out my invention.

Figure 2 shows a simplified diagram of the electrical circuits including 10 kilowatt 110 volt axle generator and the 5 kilowatt 40 volt axle generator, together with the necessary control and lamp voltage regulator.

From the inception of my invention, including that shown in my other applications above designated, I realized that the air conditioning equipment may not operate satisfactorily, on railway cars, moving at speeds below approximately 35 miles per hour, and, therefore, made a thorough study of the speed recorder tapes for various trains operating between certain points. As a result of this study I found that from 16.4 to 22.5 percent of the total schedule time the car was operating at 35 miles per hour, or less, including the station stop time, which varied from 4.3 to 8.4 percent of the total schedule time.

Experience thus far with a car in actual commercial operation with my system as disclosed in my other applications indicates that the temperature within the car rises more rapidly when the air conditioning equipment is not functioning, due to slow speed or standing at stations. As a consequence I have now improved the system so that it will operate satisfactorily under all conditions, by changing the cold water pump motor and the fan motor which supplies conditioned air through the circulating ducts to the car from nominal 110 volts D. C. to nominal 32 volts D. C., so that these two motors may operate continuously, drawing their current supply from the battery (or other) system of the car, when the car is standing, or is operating below the critical speed of the generator, which, as close as I have thus far determined, is 30 miles per hour.

Referring to the drawing, the reference letter A designates the fresh air intake and filter, B the cooling coils, C the fan motor, D the air ducts leading into the car, E the air circulating intake, F the sylphon temperature regulator shutter control, G the surge tank, H the cold water pump, I the evaporator, J the water supply tank, K the cooling tower in which is a motor driven fan S, N the ammonia compressor, O the thermo control, P the expansion valve, and R the back pressure valve. The system is equipped with a strainer 1, a pressure gauge 2, and a relief valve 3. The parts thus far described may accord with the disclosures in my prior applications.

The fan motor C in the present embodiment is, preferably, in the light of my experiments in commercial service, nominal 32 volts D. C., and the cold water pump H is likewise nominal 32 volts D. C., so that these two motors may operate continuously, drawing their current supply from the battery system of the car when the car is standing, or is operating below the critical speed of the generator on the car, which is about 30 miles per hour.

The individual car system of air conditioning, as disclosed in this and my application, Serial No. 400,929, contemplates all the necessary generating and utilization equipment whereby a car is a unit with respect to the air conditioning. The car may be operated in any train, and may be placed in any position in the train.

The data obtained on tests made indicates that a total capacity of about 10 kilowatts of electric energy will be required per car. It is slightly greater for coaches where seats are provided for 82 passengers than it would be for cars of less seating capacity, such as Pullman or parlor cars or smaller coaches.

For dining cars, such as B. & O. 12-table colonial cars, where 36 people may be seated at the tables and the car has a staff of five waiters and a steward, or carries a total of 42 people, the refrigerating requirements are estimated at about the same as a coach with a seating capacity of 82 people. The reason for this is that although there are only about half the number of people in the car it is probable that there will be an appreciable amount of heat from the kitchen and the hot food which would be added to the normal cooling requirements of the dining compartment. Therefore, in equipping the first car 10 kilowatts of electric energy will be provided for the air conditioning equipment.

On individually equipped cars the operation and output of the electric generator will be of an intermittent character, i. e., the generator will not deliver its rated output unless the car speed is above a certain critical point, say 20 miles per hour, or possibly a higher speed, say 30 miles per hour. It is obvious, therefore, that when the car is standing still at station stops the axle generator will be inoperative; likewise when the train has reduced its speed because of signal indications or speed restrictions below the critical speed i.e., the minimum speed at which the axle generator will give its full output.

A study has been made of the speed recorder tapes for various trains operating between Washington and Jersey City, also between Jersey City, Chicago and St. Louis, with the following result.

| Run | Train no. | Schedule time | Station stops | Percent | 20 M. P. H. or less | Percent | 35 M. P. H. or less | Percent |
|---|---|---|---|---|---|---|---|---|
| J. C.-Washngtn | 1 | 4'45" | 14" | 4.9 | 32" | 11.2 | 52" | 18.3 |
| Washtn-J. C | 2 | 4'35" | 12" | 4.6 | 37¼" | 13.7 | 55" | 20 |
| J. C.-Washtn | 5 | 5'5" | 17" | 5.6 | 33" | 11.1 | 58" | 19.0 |
| J. C.-St. Louis | 1 | 26'45" | 134" | 8.4 | 204" | 12.7 | 382" | 22.5 |
| Washtn-J. C | 26 | 3'55" | 10" | 4.3 | 18" | 7.7 | 48" | 20.4 |
| J. C.-Chicago | 5 | 23'5" | 115" | 8.4 | 193" | 14.0 | 227" | 16.4 |

Successful air conditioning on individually equipped cars can be maintained, notwithstanding the intermittent operation of the equipment, provided those interruptions to operation are not of too long duration. Assuming the car cooled to the desired temperature, the cooling equipment may be discontinued for an appreciable time before the temperature of the air rises to an objectionable point. In fact automatic control equipment will be provided whereby the operation of the refrigerating equipment will be automatically discontinued should the temperature of the cooling water and consequently the temperature of the air in the car fall below a certain point. Operation of the refrigerating equipment will be automatically resumed when the temperature of the water and consequently the air in the car rises to a certain predetermined point.

On individually equipped cars a wayside connection at terminal points may be provided whereby electrical energy of proper characteristics may be made available so that the air conditioning equipment on the car may be operated while it is standing in the depots or yards. In this manner the air in the car will be properly conditioned before it is placed in the train for the reception of passengers.

It may be found, in some instances, under various atmospheric conditions that the refrigerating equipment may be inoperative when the temperature rises to any objectionable point, therefore the car will be equipped with generating equipment which will give its full output at minimum car speed of about 27 miles per hour and provision will be made to give a proportionate output at lower speeds, say 21 miles per hour.

At the conception of this invention the gear drive for the generator was only developed for a nominal 2.5 to 1 ratio, i. e., there were 47 teeth on the axle gear and 19 teeth on the jack shaft pinion which gives a gear ratio of 2.47 to 1.

The following table shows the R. P. M. of the car axle at various car speeds and for both 36" and 33" car wheels. Also the R. P. M. of the generator corresponding to these car speeds where 2.5 to 1 gear ratio of drive is used.

| Car speed, M. P. H. | Axle 36" | R. P. M. 33" | Generator gear ratio 36" | R. P. M. 2.5-1 33" |
|---|---|---|---|---|
| 20 | 187 | 204 | 468 | 510 |
| 30 | 280 | 306 | 700 | 765 |
| 40 | 373 | 408 | 933 | 1,020 |
| 50 | 467 | 510 | 1,168 | 1,275 |
| 60 | 560 | 612 | 1,400 | 1,530 |
| 70 | 654 | 715 | 1,635 | 1,788 |
| 80 | 747 | 817 | 1,868 | 2,043 |
| 90 | 840 | 920 | 2,100 | 2,300 |

It is possible, should it be desirable, to increase the gear ratio somewhat. This would result in making present design of axle generator of larger capacity available for use to give 10 kilowatts at nominal 110 volts with but little change in the design of the generator. It may turn out, however, that an entirely new design of gear drive would be required should the gear ratio be changed. In this event it might be better to design a generator suitably adapted to the 2.5 to 1 gear ratio and to give its full output at the desired minimum car speed.

From the information at present available it appears that for the reasons above mentioned together with the fact that the total stop time and the running time of our better classes of trains to which air conditioning might be applied is only from 16% to 22% of the total schedule time, of which 5% to 8% is standing time, that we can safely obtain the desired results by designing the gear drive and generator for minimum full load speed at the rate of from 27 to 35 miles per hour. As the car speed declines we can adjust the automatic switch so that it will remain closed until the voltage of the generator is reduced from 110 to perhaps 85 or even 75 volts. In this manner the air conditioning equipment will operate at reduced capacity although the car speed may be under 35 miles per hour.

The following description applies to the operation of the electrical equipment:

It is desirable and in practice essential that the cold water pump motor H be in operation when the compressor motor N and the auxiliary motors S and L are in operation.

To insure that this condition is met at all times, it is necessary to so arrange the control circuits that 110 volt electrical energy can be supplied for the operation of motors N, S and L when and only when motor H is in operation. A circuit marked T—T' is, therefore, provided which connects the 110 volt or high voltage circuit branch $T^2$ and the triple pole double throw switch 4 engageable with contacts 5, 6, 7, 8.

Fan motor C may be operated at any time with or without the operation of the other motors H, N, S and L. The low voltage circuit branch $T^3$ supplies current for the operation of fan motor C from the battery U or the five kilowatt 40 axle generator U' through its control $U^2$, and is tapped onto the circuit beyond the lamp voltage regulator V. If it is desired to operate the fan motor C only, triple pole double throw switch 4 is closed to the right, the circuit for motor C therefore starts at point V in one side of circuit $T^3$, thence through conductor 9 to triple pole double throw switch 4, thence to contact 5, and then through the speed regulator W into motor C and back through conductor 10 and the control W' to the other side of circuit $T^3$. If triple pole switch 4 is closed to the left it will be noted that the circuit to fan motor C is closed through contact 6 and thence as above described. When triple pole double throw switch 4 is closed to the left unregulated current from the battery U and the 40 volt axle generator U′ is supplied for the operation of motor H, and the circuit is from one side of circuit $T^3$ through conductor 11 to the triple pole switch 4, thence to motor H, and then through the control W′ back through conductor 10 to the other side of circuit $T^3$.

The act of closing triple pole switch 4 to the left also completes the circuit T—T′ and $T^2$ through one blade of the triple pole switch 4; therefore, 110 volt electrical energy from the generator X through the control X′ or from the wayside connection $X^2$ in a yard or at a station is now available for the operation of motors N, S and L.

In operation, motor N is started first through its control Y and after motor N has been brought up to full speed, then motors S and L are automatically started through the common control Y′ for these two motors.

What I claim is:

1. In an air conditioning apparatus for railway cars, a motor driven air circulating fan, a motor driven compressor, a motor driven refrigerant circulating pump, electrical current supplying means for the motors including high and low voltage sources, and controlling means for supplying current through said current supplying means to the fan motor alone from the low voltage source or the fan and pump motors from the low voltage source and the compressor motor from the high voltage source.

2. In an air conditioning apparatus for railway cars, a motor driven air circulating fan, a motor driven compressor, a motor driven refrigerant circulating pump, electrical current supplying means for the motors including high and low voltage generators and a battery, and a switch device operable for governing said current supplying means for supplying current to the fan motor alone from the low voltage source or for supplying current to the fan and pump motors from the low voltage source and simultaneously to the compressor from the high voltage source.

3. In an air conditioning apparatus for passenger vehicles having electrically driven working parts operable at relatively low and high voltages, a low voltage circuit including an axle driven low voltage generator and a battery fed thereby for furnishing current for driving the low voltage driven parts, said battery operating to drive said low voltage driven parts when the speed of the low voltage generator falls below a predetermined speed, and a high voltage circuit including an axle driven high voltage generator for furnishing current to drive the high voltage driven parts, and a switch device for connecting the low voltage circuit with the parts to be driven thereby without connecting the high voltage circuit with the parts to be driven thereby or for simultaneously connecting both circuits with the parts to be driven thereby.

4. In an air conditioning apparatus for passenger vehicles having electrically driven working parts operable at relatively low and high voltages, a low voltage circuit including an axle driven low voltage generator and a battery fed thereby for furnishing current for driving the low voltage driven parts, said battery operating to drive said low voltage driven parts when the speed of the low voltage generator falls below a predetermined speed, and a high voltage circuit including an axle driven high voltage generator and an external current source connection for furnishing current to drive the high voltage driven parts, and a switch device for connecting the low voltage circuit with the parts to be driven thereby without connecting the high voltage circuit with the parts to be driven thereby or for simultaneously connecting both circuits with the parts to be driven thereby.

5. An air conditioning and circulating apparatus for passenger vehicles embodying air conditioning and circulating means, sets of electrically driven devices for operating the same, said sets of devices being operable at relatively high and low voltages, a low voltage circuit including a battery and an axle driven generator, a high voltage circuit including a high voltage axle generator, said battery of the low voltage circuit being constantly in circuit connection with the low voltage generator, and a switch device for closing the low voltage circuit along with the set of devices actuated thereby or for simultaneously closing both the low voltage and high voltage circuits.

6. Apparatus for conditioning the air in a passenger vehicle comprising a cooling chamber, a refrigerant compressor for compressing a refrigerant which acts to cool the air passing through said chamber, a fan for forcing the air to be cooled through said chamber and into the space occupied by the passengers, a high voltage generator driven through movement of the vehicle for energizing said compressor, and a low voltage generator, driven through movement of the vehicle, and a battery charged thereby for energizing said fan.

7. Apparatus for conditioning the air in a passenger vehicle comprising a cooling chamber, a refrigerant compressor for compressing a refrigerant which acts to cool the air passing through said chamber, a refrigerant pump, a fan for forcing the air to be cooled through said chamber and into the space occupied by the passengers, a high voltage generator driven through movement of the vehicle for energizing said compressor, and a low voltage generator, driven through movement of the vehicle, and a battery charged thereby for energizing said fan and pump.

8. Apparatus for conditioning the air in a passenger vehicle comprising a cooling chamber, a refrigerant compressor for compressing a refrigerant which acts to cool the air passing through said chamber, a fan for forcing the air to be cooled through said chamber and into the space occupied by the passengers, a high voltage generator driven through movement of the vehicle for energizing said compressor, a low voltage generator, driven through movement of the vehicle, and a battery charged thereby for energizing said fan, and wayside connections for connecting said compressor to an outside electrical source as when said vehicle is standing in a station.

9. Apparatus for conditioning the air in a passenger vehicle comprising a cooling chamber, a refrigerant compressor for compressing a refrigerant which acts to cool the air passing through said chamber, a refrigerant pump, a fan for forcing the air to be cooled through said chamber and into the space occupied by the passengers, a high voltage generator driven through movement of the vehicle for energizing said compressor, a low voltage generator, driven through movement of the vehicle, and a battery charged thereby for energizing said fan and pump, and wayside connections for connecting said compressor to an outside electrical source as when said vehicle is standing in a station.

10. Apparatus for conditioning the air in a railway passenger car comprising a cooling chamber, a refrigerant compressor for suppyling refrigerant which acts to cool the air passing through said chamber, a high voltage motor for driving said compressor, a fan for forcing the air to be cooled through said chamber and into the space occupied by the passengers, a low voltage motor for driving said fan, an axle driven low voltage generator and a battery charged thereby for energizing said fan motor, and wayside connections for connecting said high voltage motor to an outside electrical source as when said car is standing in a station.

11. Apparatus for conditioning the air in a railway passenger car comprising a cooling chamber, a refrigerant compressor for supplying refrigerant which acts to cool the air passing through said chamber, a high voltage motor for driving said compressor, a fan for forcing the air to be cooled through said chamber and into the space occupied by the passengers, a low voltage motor for driving said fan, a refrigerant pump, a low voltage motor for driving said pump, an axle driven low voltage generator and a battery charged thereby for driving said fan, motor, and said pump, and wayside connections for connecting said high voltage motor to an outside electrical source as when said car is standing in a station.

JESSE H. DAVIS